United States Patent
Laborbe et al.

(10) Patent No.: US 9,850,412 B2
(45) Date of Patent: Dec. 26, 2017

(54) CURE-ON-DEMAND LIQUID SEALANT COMPOSITION, PROCESS FOR THE PREPARATION THEREOF AND USES THEREOF

(71) Applicant: Sealants Europe SAS, Bezons (FR)

(72) Inventors: Elise Laborbe, Courtempierre (FR); Benoit Le Rossignol, Montargis (FR); Bernard Boutevin, Montpellier (FR); Rémi Auvergne, Saint Georges d'Orques (FR); Vincent Froidevaux, Montpellier (FR)

(73) Assignee: Sealants Europe SAS, Bezons (FR)

( * ) Notice: Subject to any disclaimer, the term of this patent is extended or adjusted under 35 U.S.C. 154(b) by 0 days.

(21) Appl. No.: 14/703,111

(22) Filed: May 4, 2015

(65) Prior Publication Data
US 2015/0232725 A1    Aug. 20, 2015

Related U.S. Application Data

(62) Division of application No. 13/690,084, filed on Nov. 30, 2012, now abandoned.

(30) Foreign Application Priority Data

Nov. 30, 2011  (FR) ..................... 11 60969

(51) Int. Cl.
| | | |
|---|---|---|
| *C08G 75/04* | (2016.01) | |
| *B05D 3/02* | (2006.01) | |
| *B05D 3/00* | (2006.01) | |
| *B29C 71/02* | (2006.01) | |
| *B29C 71/04* | (2006.01) | |
| *C04B 41/00* | (2006.01) | |
| *C08J 7/18* | (2006.01) | |
| *C08G 69/26* | (2006.01) | |
| *C08L 77/00* | (2006.01) | |
| *C08L 79/00* | (2006.01) | |
| *B29C 65/00* | (2006.01) | |
| *B32B 37/00* | (2006.01) | |
| *C09J 181/04* | (2006.01) | |
| *B29C 65/54* | (2006.01) | |
| *B29K 81/00* | (2006.01) | |
| *B29K 79/00* | (2006.01) | |
| *B29L 31/00* | (2006.01) | |

(52) U.S. Cl.
CPC ............. *C09J 181/04* (2013.01); *B29C 65/54* (2013.01); *B29K 2079/08* (2013.01); *B29K 2081/04* (2013.01); *B29L 2031/00* (2013.01)

(58) Field of Classification Search
None
See application file for complete search history.

(56) References Cited

U.S. PATENT DOCUMENTS

| | | |
|---|---|---|
| 3,247,138 A | 4/1966 | Jorczak et al. |
| 3,736,301 A | 5/1973 | Berenbaum et al. |
| 4,130,469 A | 12/1978 | McGinniss |
| 5,034,279 A | 7/1991 | Wilson, Jr. et al. |
| 5,411,776 A | 5/1995 | Schmidt et al. |
| 6,831,132 B2 | 12/2004 | Liu et al. |
| 7,022,861 B1 | 4/2006 | McElhanon et al. |
| 2004/0157002 A1 | 8/2004 | Bons et al. |
| 2004/0266954 A1* | 12/2004 | Jen ................. C08F 212/14 525/326.1 |
| 2008/0085950 A1 | 4/2008 | Ganapathiappan et al. |

FOREIGN PATENT DOCUMENTS

| | | |
|---|---|---|
| EP | 0 619 355 A1 | 10/1994 |
| EP | 1 478 703 A1 | 11/2004 |

OTHER PUBLICATIONS

Preliminary Search Report and Written Opinion for French Application No. 1160969 dated Jul. 10, 2012.
Sanchez, A. et al., *Maleimide-Dimethylfuran exo Adducts: Effective Maleimide Protecion in the Synthesis of Oligonucleotide Conjugates*, Organic Letters, vol. 13, No. 16 (Aug. 19, 2011) 4364-4367.
Lucke, H., *ALIPS-Aliphatic Polysulfides—Monograph of an Elastomer*, Huthig & Werpf (1994), 86 pages.
European Search Report from corresponding European Patent Application No. 12194673.5 dated Feb. 4, 2013.
Hussain et al.; "Use of Polymers from Biomass in Paints"; Progress in Organic Coatings 45 (2002) 435-439.
Office Action from corresponding European Patent Application No. 12194673.5 dated Feb. 17, 2014.

* cited by examiner

*Primary Examiner* — Robert T Butcher
(74) *Attorney, Agent, or Firm* — Alston & Bird LLP

(57) ABSTRACT

The present invention is directed to a liquid sealant composition based on polysulphide, capable of curing on demand, and the process for preparing same, the liquid sealant composition including: (i) a polysulphide comprising an —SH end group, (ii) a crosslinking agent chosen from ethylenically unsaturated or acetylenically unsaturated compounds, the unsaturated ethylenic or unsaturated acetylenic functions of the crosslinking agent being chemically blocked with a blocking agent, and (iii) optionally, a catalyst. The present invention also relates to a process for coating a substrate with a composition according to the invention, and also to the cured sealant materials formed from this composition. Finally, the invention relates to the use of a liquid sealant composition according to the invention for the construction and/or the maintenance, and more particularly for the adhesive bonding and/or the protection, of vehicles and machines.

22 Claims, 1 Drawing Sheet

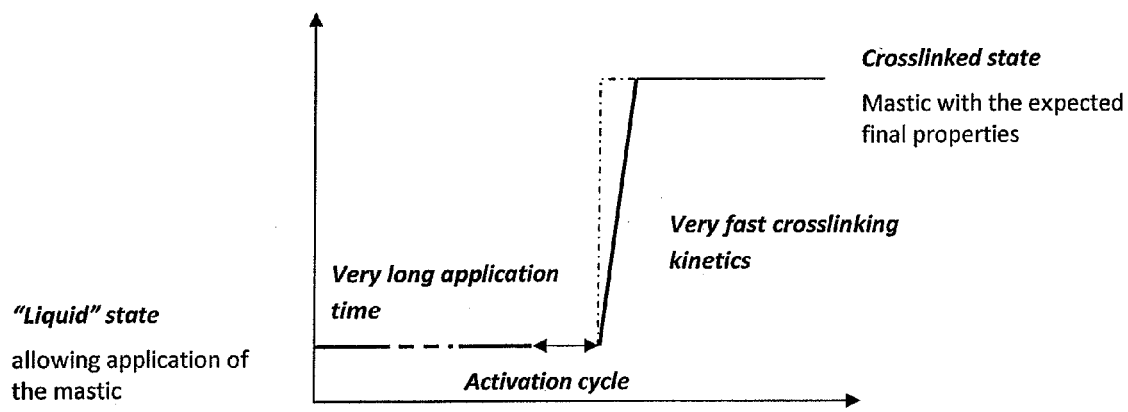

CURE-ON-DEMAND LIQUID SEALANT COMPOSITION, PROCESS FOR THE PREPARATION THEREOF AND USES THEREOF

CROSS REFERENCE TO RELATED APPLICATIONS

This application is a divisional of U.S. application Ser. No. 13/690,084, filed Nov. 30, 2012, which claims priority to French Application No. 11 60969 filed Nov. 30, 2011, the entire contents of which are incorporated herein by reference.

FIELD

The subject of the invention is a new liquid sealant composition based on polysulphide, capable of curing on demand, and the process for preparing same. The present invention also relates to a process for coating a substrate with a composition according to the invention. The cured sealant materials formed from this composition also form part of the invention. Finally, the invention also relates to the use of a liquid sealant composition according to the invention for the construction and/or the maintenance, and more particularly for the adhesive bonding and/or the protection, of vehicles and machines.

BACKGROUND

Polysulphide compositions in liquid and curable form have been used for a long time in the sealant field, owing to the durability and impermeability of these polymers (AL-IPS—Aliphatic Polysulfides—Monograph of an elastomer—Heinz LUCKE, Hüthig & Wepf, 1994).

These sealant materials, commonly referred to as "mastics", are used in particular for the isolation, adhesive bonding or protection against corrosion of construction materials used in the construction, transport or aeronautical fields. They are generally two-component systems consisting of a base (or matrix) and a curing agent (or crosslinking agent). It is during a mixing step that these two components react together and crosslink so as to form the final mastic.

EP 0 619 355 describes a polysulphide system crosslinked with (meth)acrylates, using a guanidine derivative as catalyst. The reaction brought about is very rapid (very short gel time), which leaves little time for using the mastic. The gel times vary from less than one minute to 20 minutes without retarder, and can be increased at most up to 7 hours through the use of an acid retarder. These systems are therefore neither perfectly controlled nor adjustable as desired, and the safety period for use is not therefore "infinite".

There are at the current time two routes for crosslinking polysulphide (PS) polymers comprising —SH end groups:

by oxidoreduction reaction: these are polysulphide/manganese oxide (PS/MnO$_2$) systems which exhibit rather slow crosslinking kinetics (hardening of the mastic), which can extend over several days, by addition reaction: these are polysulphide/epoxy resin (PS/epoxy) systems which exhibit rather fast crosslinking kinetics, but the reaction of which is incomplete (not total) at ambient temperature. These systems have a high degree of extraction which results in stiffening of the mastic when it is brought to temperature.

The main drawback of these mastics is the need for a compromise between a gel time sufficiently long for the safety period for use during the application, and crosslinking kinetics which are as rapid as possible with regard to the mastic becoming hard and to the handling thereof.

Thus, the concept of controlled-initiation Sealant Cure On Demand (SCOD) mastics has come to light. These mastics have a use and application time which is as long as possible and rapid setting kinetics once the crosslinking has been initiated.

Patent EP 1 478 703 describes a process for coating a substrate by applying a sealant material capable of curing on demand. The material used can be based on polysulphide with an —SH end group, together with a crosslinking agent such as an acrylate, an isocyanate or an epoxy resin, said not yet cured material containing a latent catalyst which is formed and/or released in active form under the action of external energy, such as heating or electromagnetic radiation, and by which the reaction between the polysulphide and the curing agent is initiated and/or accelerated. This reaction results in the curing of the sealant material. The latent catalyst used is an amine encapsulated in a polymer shell. However, it is observed that this system does not enable complete blocking of the reaction between the polysulphide and the crosslinking agent. A latency of the reaction is observed, which means that the reaction occurs, but is greatly slowed down. The latent catalyst retains its primary function, namely that it is an accelerator of the reaction; its role is not to prevent the reaction between the polysulphide and the curing agent. Thus, and since the reaction between the polysulphide and the crosslinking agent is not totally blocked, the SCOD systems of patent EP 1 478 703 are necessarily "two-component" systems. In addition, the use of a latent catalyst in the form of capsules has many disadvantages, namely that:

the latent catalyst capsules can be destroyed during the mixing step, and result in an early loss of stability of the mastic, the crosslinking reaction is heterogeneous owing to a concentration effect of the latent catalyst, the dispersion of the capsules is more difficult than in the case of a liquid catalyst, which results in a deterioration of the final properties of the mastic, and more particularly of the mechanical properties and of the adhesion, the stability of the catalyst capsules is limited over time owing to diffusion phenomena, the size of the capsules, even minimized, is not suitable for certain applications such as, for example, interposition between sheet metal, the thickness of the mastic then having to be very thin, about from 100 to 200 µm.

SUMMARY

The present invention aims to overcome these drawbacks by developing liquid sealant compositions in which the reaction between the matrix and the curing agent would be effectively blocked by making the reactive function of the curing agent inaccessible, independently of the presence or absence of a catalyst. This concept allows the preparation of a "one-component" mastic system which is stable over time at ambient temperature, and consequently stable during storage. This system can be irreversibly and rapidly cured on demand by virtue of the provision of external (thermal, photochemical, etc.) energy. As a result, the strategy of blocking the crosslinking according to the invention, by chemical blocking of the reactive function of the crosslinking agent, results in a more effective blocking of the mastics of the invention compared with the mastics of patent EP 1 478 703.

The liquid sealant compositions of the invention also allow the use of curing agents which are very reactive with respect to the polysulphide, without the risk of impairing the stability of the one-component system.

After curing, the compositions of the invention result in crosslinked mastics exhibiting excellent mechanical and chemical properties:
- a tensile strength of at least 1 MPa,
- an elongation at break of at least 100%,
- good low-temperature (~−53° C.) resistance, and
- good chemical resistance to jet fuel.

For all these reasons, the compositions of the invention correspond much more satisfactorily to the SCOD concept as it is really defined, than the solutions hitherto described in the prior art (a scheme of the principle of an ideal SCOD system is represented in FIG. 1).

BRIEF DESCRIPTION OF THE DRAWINGS

FIG. 1 illustrates a scheme of the principle of an ideal SCOD system.

DETAILED DESCRIPTION

Thus, the first subject of the invention is a liquid sealant composition comprising at least:
(i) a polysulphide with an —SH end group,
(ii) a crosslinking agent chosen from ethylenically unsaturated or acetylenically unsaturated compounds, said unsaturated ethylenic or unsaturated acetylenic functions being chemically blocked with a blocking agent, by Diels-Alder reaction,
(iii) optionally, a catalyst.

The blocking agent serves to protect the unsaturated ethylenic or unsaturated acetylenic function of the crosslinking agent. It is subsequently removed under the effect of external energy which causes the release of the unsaturated ethylenic or unsaturated acetylenic function, and which results in the initiation of the reaction between the polysulphide and the crosslinking agent and therefore in the curing of the mass.

The polysulphide of the invention preferably has a —SH functionality $\geq 2$. Said polysulphide can have an average molecular weight of between 1000 and 6500 g·mol$^{-1}$, and preferably between 2000 and 3500 g·mol$^{-1}$. Its viscosity can be between 1 and 150 Pa·s, and preferably between 10 and 50 Pa·s. The Tg of the polysulphide can be between −55 and −65° C.

Advantageously, the crosslinking agent of the invention has a functionality $f \geq 2$, and preferably $2 \leq f \leq 4$. The crosslinking agent can be a compound or a mixture of several compounds bearing an allyl function, a maleimide function, or an ethylenically unsaturated or acetylenically unsaturated function bearing an electron-withdrawing group in the alpha position with respect to this double bond or this triple bond, it being possible for said function to be an aldehyde function, ketone function, ester function, hemiester function, amide function, hemiamide function, ester-amide function, nitrile function or imide function which is α,β-ethylenically unsaturated. The crosslinking agents which are most preferred are maleimides, hemiesters and ester-amides.

The stoichiometric ratio between the ethylenic function of the curing agent and the —SH group of the polysulphide can range from 1 to 1.4.

According to one particularly advantageous embodiment, the crosslinking agent is an α,β-ethylenically unsaturated imide compound or a mixture of several α,β-ethylenically unsaturated imide compounds chosen from monomaleimide, bismaleimide or trismaleimide compounds of formula:

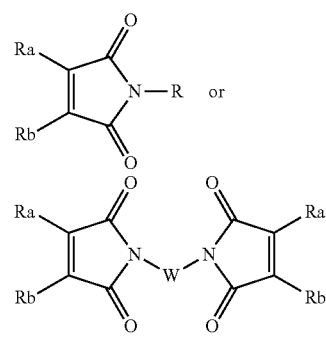

in which:
R is chosen from linear or branched $C_1$-$C_{30}$ alkyl chains,
$R_a$, $R_b$, $R_c$, $R_d$, $R_e$ and $R_f$, which may be identical or different, are chosen from H or linear or branched $C_1$-$C_{30}$ alkyl chains, and
W is a polyether, polythioether, polyester, polyamide or polysulphide unit.

By definition, a polysulphide is a polymer comprising at least one S—S bond in its chain.

The W unit may be a $C_1$-$C_{30}$ alkyl chain comprising one or more heteroatoms chosen from O, S or N.

In the case where W is a polyether unit, it is preferably a polyethylene glycol (PEG) unit, a polypropylene glycol (PPG) unit, or a mixed PEG/PPG unit. The crosslinking agent is then preferably chosen from the compounds of formula:

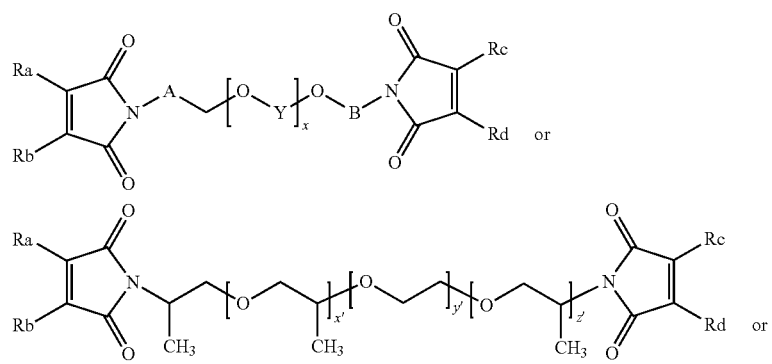

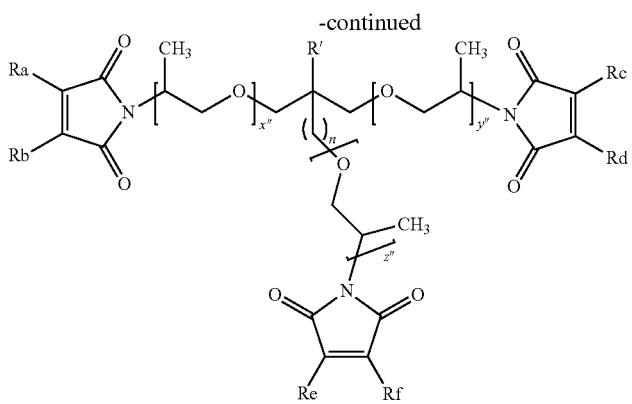

in which:
- $R_a$, $R_b$, $R_c$, $R_d$, $R_e$ and $R_f$, which may be identical or different, are chosen from H or linear or branched $C_1$-$C_{30}$ alkyl chains,
- A and B, which may be identical or different, are linear or branched $C_1$-$C_{30}$ alkyl chains which can comprise, in their chain, one or more heteroatoms chosen from O, S or N,
- Y is chosen from —$CH_2$—, —$CH_2$—$CH_2$—, —$CH_2$—$CH_2$—$CH_2$—, —$CH_2$—$CH(CH_3)$— and —$CH_2$—$CH_2$—$CH_2$—$CH_2$—,
- x, x', x", y, y', y", z, z' and z", which may be identical or different, range from 0 to 70, preferably from 1 to 40, and even more preferentially from 1 to 12,
- the sums x+y+z, x'+y'+z' and x"+y"+z" are strictly greater than 1, and preferably between 1 and 15,
- n ranges from 0 to 6, and preferably n=0 or 1,
- R' is H or a $C_1$-$C_6$ alkyl radical, and preferably R' is H, $CH_3$ or $C_2H_5$, and in which the ethylenic bond of the monomaleimide ring or the ethylenic bonds of the bismaleimide or trismaleimide rings are blocked by Diels-Alder reaction with said blocking agent.

In the case where W is a polythioether or polysulphide unit, said unit may be a $C_1$-$C_{30}$ alkyl chain comprising one or more O heteroatoms or one or more S heteroatoms. It is preferably a unit of formula:
—$CH_2$—$CH_2$—$CH_2$—S—$CH_2$—$CH_2$—O—$CH_2$—$CH_2$—S—$CH_2$—$CH_2$—$CH_2$—, or
—$CH_2$—$CH_2$—$CH_2$—S—[$CH_2$—$CH_2$—O—$CH_2$—O—$CH_2$—$CH_2$—S]$_{n'}$-$CH_2$—$CH_2$—O—$CH_2$—O—$CH_2$—$CH_2$—S—$CH_2$—$CH_2$—$CH_2$—, in which n' ranges from 0 to 7.

The blocking agent may be a diene comprising at least one pentacyclic nucleus, and preferably a diene corresponding to the following formula:

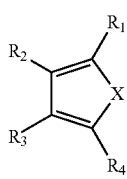

in which:
- $R_1$, $R_2$, $R_3$ and $R_4$, which may be identical or different, are chosen from H or $C_1$-$C_{12}$ alkyl chains optionally functionalized with at least one ester, ether, ketone or amide function,
- X=$CH_2$, O, S, or N—$R_x$ in which $R_x$ is chosen from linear or branched $C_1$-$C_{30}$ alkyl chains.

According to one advantageous embodiment, X=O.

According to another advantageous embodiment:
- the $R_1$ radical and optionally the $R_4$ radical are identical $C_1$-$C_{12}$ alkyl chains optionally functionalized with at least one ester, ether, ketone or amide function, and preferably chosen from the following groups:

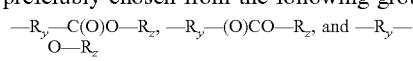

in which:
- $R_y$ is a linear or branched $C_1$-$C_8$, preferably $C_1$-$C_4$, and even more preferentially $C_1$-$C_2$, alkyl chain,
- $R_z$ is a linear, branched or cyclic $C_1$-$C_{12}$, preferably $C_1$-$C_6$, alkyl chain, and even more preferentially a linear $C_1$-$C_2$ alkyl chain, or an aryl group, and preferably a phenyl group,
- the $R_2$ radical, the $R_3$ radical and, optionally, the $R_4$ radical, if it is not a $C_1$-$C_{12}$ alkyl chain as mentioned above, are hydrogen atoms.

The blocking agents which are the most preferred are chosen from:

furfuryl acetate of formula:

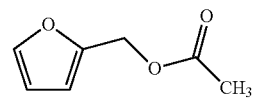

furfuryl benzyl of formula:

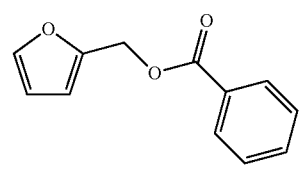 [SMILES: O=C(OCc1ccco1)c1ccccc1]

ethyl 3-(2-furyl)propanoate of formula:

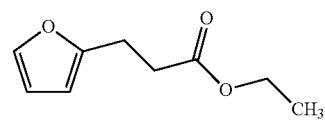

furan-2-ylmethyl pivalate of formula:

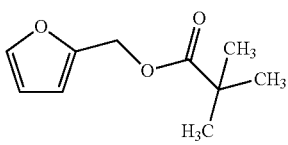

furan-2-ylmethyl-3,5,5-trimethyl hexanoate of formula:

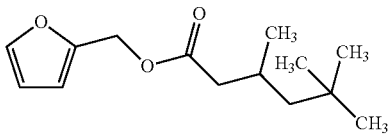 [SMILES: CC(CC(=O)OCc1ccco1)CC(C)(C)C]

furan-2-ylmethylcyclohexanecarboxylate of formula:

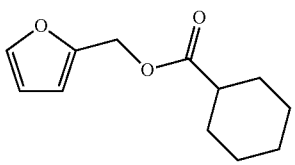 [SMILES: O=C(OCc1ccco1)C1CCCCC1]

The catalyst used is preferably chosen from:
tertiary amines, such as 1,4-diazabicyclo[2,2,2]octane (DABCO or TEDA), 1,8-diazabicyclo[5,4,0]undec-7-ene (DBU), 1,5-diazabicyclo[4,3,0]non-5-ene (DBN), N,N,N',N'',N''-pentamethyldiethylenetriamine (PMDETA), N-methyl-N'-(dimethylaminoethyl)piperazine, N,N-dimethylcyclohexylamine (DMCHA), N,N',N''-tris(dimethylaminopropyl)hexahydrotriazine or bis(2-(dimethylamino)ethyl) ether (BDMAEE),
guanidine and derivatives thereof, such as diphenylguanidine, tetramethylguanidine or di-o-tolylguanidine,
morpholine and derivatives thereof, such as N-methylmorpholine (NMM), N-ethylmorpholine (NEM), dimorpholinodiethyl ether (DMDEE), or N-methylmorpholine oxide (NMMO),
Lewis acids, such as $FeCl_3$, $AlCl_3$ or $SnCl_2$, and
tin salts, such as dibutyl tin dilaurate (DBTDL) or dioctyl tin dilaurate (DOTDL).

The catalysts which are the most preferred are tertiary amines, and more particularly 1,4-diazabicyclo[2,2,2]octane (DABCO or TEDA) and 1,8-diazabicyclo[5,4,0]undec-7-ene (DBU).

The amount of catalyst used ranges from 0 to 10 parts by weight per 100 parts of polysulphide polymer, and preferably from 0.5 to 5 parts.

Another subject of the invention relates to a process for preparing a liquid sealant composition according to the invention, namely a "ready-to-use" one-component mastic, comprising at least the following steps:
i) synthesis of the crosslinking agent as defined according to the invention, chemically blocked by Diels-Alder reaction with a blocking agent as previously defined, optionally in the presence of a catalyst, then
ii) mixing of the chemically blocked crosslinking agent obtained at the end of step i) with a liquid polysulphide polymer comprising a —SH end group, optionally in the presence of a catalyst, the mixing temperature having to be controlled so as not to exceed the crosslinking agent deblocking temperature (cooling optionally necessary), this temperature having to be below 65° C., and preferably between 20 and 40° C.

The mixing step ii) can be carried out mechanically using a mixer, for instance a Dispermat® blade (butterfly or notched) mixer, or a planetary mixer (mixer comprising a blade and one or more dispersers).

The "ready-to-use" liquid sealant composition or mastic thus prepared is subsequently packaged in a pot or in a cartridge.

The invention also relates to a coating process for attaching or adhesively bonding sealing trims and/or pieces or filling hollow spaces or intermediate gaps, said process comprising a step of applying a liquid sealant composition according to the invention to a substrate (made of aluminium, steel, glass, composites, etc.), followed by a step of deprotecting the crosslinking agent chemically blocked with a blocking agent, under the effect of external energy, which results in the initiation of the reaction between the polysulphide and the crosslinking agent, and therefore in the curing of the mass of the sealant material.

The external energy required for deblocking the crosslinking agent can be thermal energy provided:
either by conduction: heating by direct contact, by the Joule effect via an electrical resistance, or by induction,
or by convection: provision of hot air, for example using a Leister® hot air gun,
or by radiation: by infrared lamp, by high-frequency pulses such as microwaves, ultrahigh frequencies (UHF) or ultrasound.

According to one advantageous embodiment, the crosslinking agent chemically blocked with a blocking agent is deprotected by heating at a temperature in the range of from 60 to 120° C., and preferably from 70 to 100° C. Preferably, the crosslinking agent chemically blocked with a blocking agent is subjected to the action of heat for a period ranging from 15 minutes to 2 hours.

The coating process of the invention may also comprise, after the step of deprotecting the crosslinking agent, a step of curing the mass of the sealant material. This curing step is preferably carried out at a temperature ranging from 18 to 35° C., for a period ranging from 1 to 3 days.

Another subject of the invention relates to a cured sealant material which results from the curing of a liquid sealant composition according to the invention, and which exhibits, after complete curing, a tensile strength according to standard ISO 37 of at least 1 MPa, a tensile elongation at break according to standard ISO 37 of at least 100%, and a hardness according to standard ISO 7619 of at least 40 shA.

Finally, a last subject of the present invention relates to the use of a liquid sealant composition according to the invention for constructing and/or maintaining aircraft or spacecraft, motor vehicles, rail vehicles, ships, machines, appliances and furniture, and more particularly for adhesive bonding and/or protection against corrosion of aircraft or spacecraft, motor vehicles, rail vehicles, ships, machines, appliances and furniture.

In addition to the preceding arrangements, the invention also comprises other arrangements which will emerge from the following further description, which refers to examples demonstrating the advantageous properties of the compositions of the invention, and also to the appended FIG. 1 which represents a scheme of the principle of an ideal SCOD system.

EXPERIMENTAL SECTION

Example 1

This example studies the preparation of a crosslinking agent, the maleimide function of which is blocked by Diels-Alder (DA) reaction, and also the deblocking conditions, and more specifically the temperature of the retro-Diels-Alder (r-DA) reaction.

The study of the chemical blocking and deblocking of the maleimide function is carried out on a bifunctional model compound, with several blocking agents, namely furan derivatives of different natures. The determination of the DA and r-DA reaction temperatures is measured by means of NMR monitoring of the blocked maleimide, by gradual increase in the temperature.

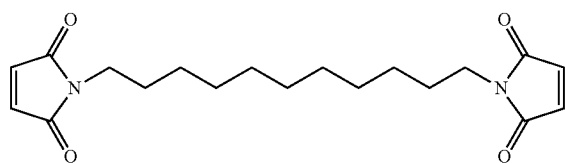 [SMILES: O=C1C=CC(=O)N1CCCCCCCCCCCN1C(=O)C=CC1=O]

Model maleimide compound used

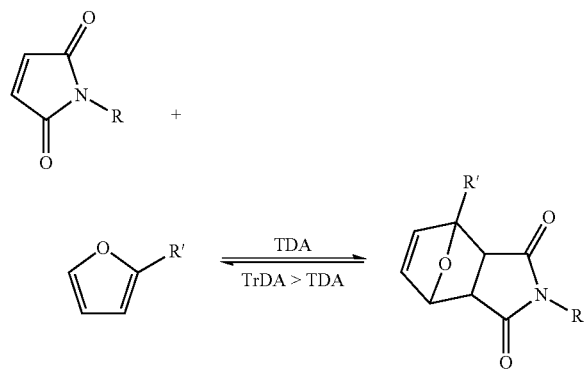

Chemical blocking of the maleimide function with furan derivatives:
thermo-reversible reaction (Diels-Alder/retro-DA)

TABLE 1

| | DA/rDA temperature (° C.) | | | |
|---|---|---|---|---|
| | Diastereoisomer 1 | | Diastereoisomer 2 | |
| | DA | rDA | DA | rDA |
| furfuryl acetate | 40 | 75 | 40 | 95 |
| furfuryl cyclohexanecarboxylate | 40 | 65 | 40 | 95 |
| furfuryl benzoate | 40 | 75 | 40 | 95 |
| furfuryl pivalate | 40 | 75 | 40 | 95 |
| furfuryl 3,5,5-trimethylhexanoate | 40 | 65 | 40 | 95 |
| ethyl 3-(furan-2-yl)propanoate | 40 | 75 | 40 | 95 |

Surprisingly, the furan derivatives make it possible to block the maleimide function at "low temperature", the DA temperatures being 40° C. (it being possible for these temperatures to be brought back to ambient temperature by increasing the reaction time from 4 hours to 4 days). Likewise, the r-DA temperatures are between 65 and 95° C., thus making it possible to envisage deblocking at "moderate temperature", and which is consequently compatible with the intended final application and the thermal activation envisaged.

Example 2

This example studies the preparation of a polysulphide mastic by crosslinking of a liquid polysulphide (PS) polymer with a bismaleimide. Two liquid bismaleimides having a PPG-type backbone are tested in parallel: one synthesized from PPG 230 (Jeffamine D230, Huntsman) and the other from PPG 400 (Jeffamine D400, Huntsman). The reactivity of these systems is studied comparatively on the bismaleimides in the blocked and nonblocked state. In the case of the blocked bismaleimide, the deblocking of the bismaleimide crosslinking agent, and therefore the activation of the crosslinking, is carried out by heating in an oven.

The blocked bismaleimide crosslinking agents are prepared beforehand.

In a first step, the liquid bismaleimides are synthesized, then purified and characterized by NMR.

In a second step, these bismaleimides are blocked by Diels-Alder reaction, via a furan-derived blocking agent, furfuryl acetate. NMR verification makes it possible to check that the double bonds of the bismaleimides are actually blocked.

The procedures implemented are detailed hereinafter.

Procedure for Synthesis of Bismaleimides Based on PPG Diamines:

Maleic anhydride (2.1 eq) is solubilized in THF (2 ml/g of anhydride), in a three-necked round-bottomed flask. The diamine (1 eq) solubilized in tetrahydrofuran (THF) (2 ml/g of diamine) is added dropwise using a dropping funnel. The mixture is left to react for 2 hours at ambient temperature.

The apparatus is then placed under nitrogen for a period of 10 minutes, and then ZnBr$_2$ (2.3 eq) is added under a nitrogen stream. Once the solid is completely solubilized, the mixture is heated to 40° C., and then a solution of bis(trimethylsilyl)amine (HMDS) solubilized in THF (1 ml/ml of HMDS) is added dropwise using a dropping funnel. The mixture is heated at 70° C. for a period of 3 hours. A viscous brown liquid is obtained.

The viscous liquid is then extracted via a liquid/liquid extraction with water and chloroform (1/3 ratio). The operation is carried out three times, in order to remove any trace of water due to the cyclization ($2^{nd}$ step). After having dried the organic phase with anhydrous Na$_2$SO$_4$, the solvent is evaporated off. Finally, the product obtained is solubilized in toluene (3 ml/g of product), and then heated at 100° C. overnight, in order to obtain exclusively the maleimide.

δH (400 MHz, CDCl$_3$): 6.61-6.51 (d, 2H, H-8'), 6.43-6.31 (m, 2H, H-8), 5.3 (d, 1H, H-7exo) and 5.25 (d, 1H, H-7endo), 4.87-4.57 (dd, 2H, H-9exo) and 4.97-4.37 (dd, 2H, H-9endo), 4.46-4.26 (s, 2H, H-1), 3.96-3.17 (m, 10H, H-3, H-5, H-4), 2.99-2.82 (dm, 2H, H-6'exo/endo, H-6exo/endo), 2.14 (s, 3H, H-10exo) and 2.11 (s, 3H, H-10endo), 1.31-0.97 (m, 12H, H-2 and H-11).

The furfuryl acetate-blocked PPG 400 bismaleimide is analysed by NMR:

δH (400 MHz, CDCl$_3$): 6.54-6.52 (d, 2H, H-8'), 6.40-6.33 (m, 2H, H-8), 5.27 (d, 1H, H-7exo) and 5.24 (s, 1H, H-7endo), 4.84-4.55 (dd, 2H, H-9exo) and 4.95-4.36 (dd, 2H, H-9endo), 4.37-4.27 (s, 2H, H-1), 3.91-3.26 (m, 20H, H-3, H-5, H-4), 2.92-2.79 (dm, 2H, H-6'exo/endo, H-6exo/endo), 2.10 (s, 3H, H-10exo) and 2.08 (s, 3H, H-10endo), 1.29-1.01 (m, 22H, H-2 and H-11).

The liquid sealant compositions are subsequently prepared from:

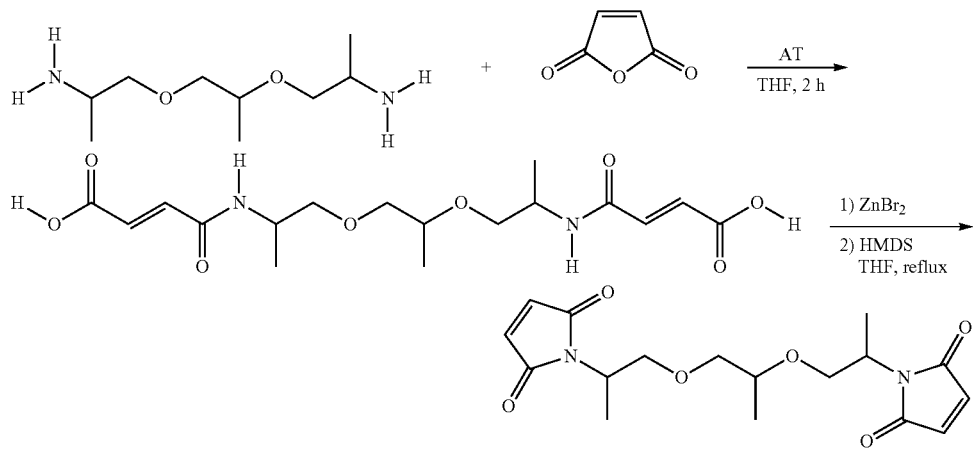

Blocking of the Maleimides by Diels-Alder Reaction:

The bismaleimide to be blocked is placed in a single-necked round-bottomed flask. Solvent (THF or DCM, 1 ml/g of product) can be added if the product is too viscous. Once the product has dissolved, the blocking agent is added in stoichiometric amount, and then the mixture is left to react for 3 to 4 days at ambient temperature, or 4 hours at 40° C. Two diastereoisomers are obtained (endo and exo), demonstrated by NMR verification.

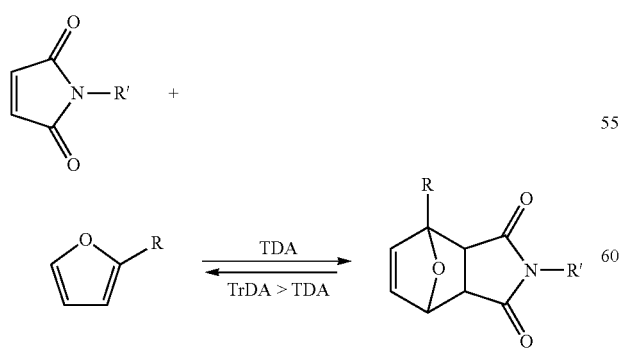

The furfuryl acetate-blocked PPG 230 bismaleimide is analysed by NMR:

- a liquid polysulphide polymer, Thioplast® G21 (Akzo Nobel),
- a crosslinking agent, incorporated into the PS in the nonblocked state or the blocked state (blocked with furfuryl acetate), chosen from the two previously synthesized bismaleimides, having the following formula:

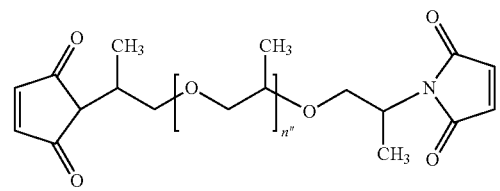

in which n"=2 (BM PPG 230) or n"=5-6 (BM PPG 400), optionally a catalyst: 1,4-diazabicyclo[2,2,2]octane (DABCO 33-LV®, Air Products).

The amounts of polysulphide and of crosslinking agent to be mixed observe the stoichiometry of 1.1 between the ethylenic functions of the bismaleimide and the thiol functions of the polysulphide. The catalyst, if it is used, is added in an amount of 3 parts (per hundred parts of polysulphide). All the constituents are mixed manually or mechanically using a Dispermat® blade mixer/disperser.

The gel time, which characterizes the time for the mastic to start to set (start of formation of the three-dimensional crosslinking network), and therefore the end of the safety period for using the mastic, is determined by a simple bench test. The test is carried out in an aluminium dish, on the basis of 20 g of polysulphide. The measurement begins as soon as the polysulphide and the crosslinking agent are brought into contact (start of the mixing step). The increase in viscosity of the system is evaluated qualitatively by stirring the mixture with a spatula, until the "gel time" or "string time" is reached, i.e. the moment at which the system begins to become elastic and begins to form a "string" when trying to withdraw the spatula.

TABLE 2

| Crosslinking agent used | Catalyst | Temperature (in ° C.) | Gel time |
|---|---|---|---|
| BM/PPG 230 | DABCO | AT | ~5 min |
|  | — | AT | 2 h 20 |
| BM/PPG 230 BLQ | DABCO | AT | no gel formation after 11 days |
|  | DABCO | 100° C. | 1 h 15 |
| BM/PPG 400 | DABCO | AT | 8 min |
| BM/PPG 400 BLQ | DABCO | AT | no gel formation after 7 days |
|  | DABCO | 100° C. | 1 h 35 |

AT = ambient temperature

The results of Table 2 show the strong reactivity of the bismaleimides with the polysulphide at ambient temperature (short gel time, <10 min in the presence of catalyst), and the very great stability of these systems with the blocked bismaleimides. The effectiveness of chemical blocking of a very reactive polysulphide/bismaleimide system, in order to obtain a very long mastic application time (at least 7 days of stability), is thus observed. Furthermore, these "ready-to-use" one-component mastics are stable during storage.

Bringing these systems with the blocked bismaleimides to temperature (100° C. in an oven) clearly makes it possible to initiate the reaction (gel time of 1h15-1h35).

A trifunctional blocked maleimide compound corresponding to the following formula was also prepared:

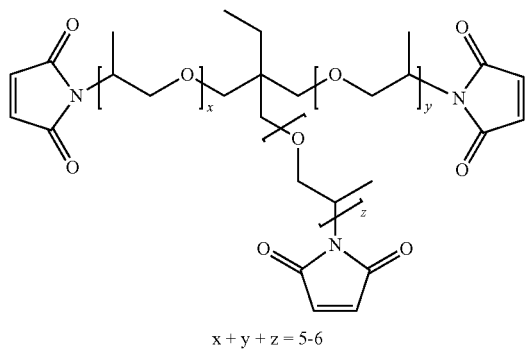

x + y + z = 5-6

Procedure for Synthesis of the Trismaleimide Compound:

Maleic anhydride (3.1 eq) is solubilized in THF (2 ml/g of anhydride), in a three-necked round-bottomed flask. The Jeffamine® T-403 triamine from Huntsman (1 eq) solubilized in THF (2 ml/g of triamine) is then added dropwise using a dropping funnel. The mixture is left to react for 2 hours at ambient temperature.

The apparatus is then placed under nitrogen for 10 minutes, and then $ZnBr_2$ (3.6 eq) is added under a nitrogen stream. Once the solid is totally solubilized, the mixture is heated to 40° C., then a solution of HMDS (3.9 eq), solubilized in THF (1 ml/ml of HMDS) is added dropwise using a dropping funnel Finally, the mixture is heated at 70° C. for 3 hours. A viscous brown liquid is obtained.

The viscous liquid then undergoes a liquid/liquid extraction with water and chloroform (1/3 respectively); the operation is repeated three times in order to remove any trace of water due to the cyclization ($2^{nd}$ step). After having dried the organic phase with anhydrous $Na_2SO_4$, the solvent is evaporated off. The product obtained is then solubilized in toluene (3 ml/g of product), and then heated at 100° C. for two days, in order to obtain exclusively the maleimide.

The blocking of this trismaleimide crosslinking agent is carried out by Diels-Alder reaction, according to the same procedure as that described previously for the bismaleimides.

A mastic was then prepared from:
- a liquid polysulphide polymer, Thioplast® G21 (Akzo Nobel),
- a crosslinking agent, incorporated into the PS, composed of a mixture of the bismaleimide (BM PPG 230) and of the trismaleimide corresponding to the formula above, both blocked with furfuryl acetate, in proportions such that the average maleimide functionality is 2.6, and
- optionally, a catalyst: 1,4-diazabicyclo[2,2,2]octane (DABCO 33-LV®, Air Products).

The mastic was subsequently characterized in a standard manner, after 14 days at ambient temperature, once the temperature deblocking had been carried out by placing in an oven at a temperature of 100° C. for a period of 1h30:
- Breaking strength (ISO 37): 1.2 MPa;
- Elongation at break (ISO 37): 143%;
- Hardness (ISO 7619): 46 shA;
- Tg (determined by DSC)=−51° C.;
- Adhesion in simple shear (on an aluminium test piece, adhesive-coated surface 25×25 mm, mastic thickness 200 nm): 1.2 MPa, surfaces of fracture 100% cohesive (fracture in the material).

Counterexample:

The compositions evaluated in the counterexample are representative of the prior art described in patent EP 1 478 703. They are PS/epoxy resin or PS/acrylate reactive systems, with a "latent" catalyst, namely an encapsulated tertiary amine.

The PS/epoxy resin system is a Thioplast® G21 (Akzo Nobel)/Novolac DEN 431 epoxy resin (Dow Chemical) system, functionality 2.8 and EEW (Epoxide Equivalent Weight)=175 g/mol.

The PS/acrylate system is a Thioplast® G21 (Akzo Nobel)/SR 454 (Sartomer): triacrylate (TMPEOTA, ethoxylated trimethylolpropane triacrylate) system.

The encapsulated amine catalyst was prepared in the form of microparticles based:
- on porous silica,
- on tertiary amine: Polycat® SA2/LE (Air Products)—DBU retarded, and
- on plant wax (melting point ~75° C.).

Firstly, the amine in liquid form is adsorbed onto the silica. The silica particles containing the amine are then coated with wax in a fluidized airbed (vaporization of the wax in the molten state).

The formulae corresponding to the systems evaluated are given in Table 3 below:

TABLE 3

|  | PS/epoxy resin | PS/acrylate |
|---|---|---|
| Thioplast ® G 21 | 100 | 100 |
| DEN 431 | x |  |
| SR 454 |  | x |
| DBU catalyst (in encapsulated or free form), active amount | 1.5 | 1.5 | x: The amount of epoxy resin or of acrylate added to the polysulphide polymer is calculated so as to observe the epoxy or acrylate/–SH = 1.1 stoichiometric ratio.

In the two cases, the systems are prepared by manually mixing the polysulphide, the crosslinking agent (epoxy resin or acrylate) and the amine catalyst (liquid in its free form or else encapsulated in its latent form). The manual mixing allows "gentle" mixing of the constituents, and thus avoids any damage to the catalyst microparticles which could generate early activation of the reactive system.

The two systems representative of patent EP 1 478 703 are compared with a system according to the invention: PS/BM PPG 230 (blocked or nonblocked) as described in Example 2.

The gel times (determined at 23° C.) of these various systems are reproduced in Table 4 below:

TABLE 4

| | Composition according to patent EP 1 478 703 | | Composition according to the invention | |
|---|---|---|---|---|
| | PS/epoxy resin | PS/acrylate | PS/maleimide | |
| Free catalyst | ~11 min | <1 min | Nonblocked maleimide | ~5 min |
| "Encapsulated" catalyst | 6-7 days | 24 h | Blocked maleimide | >4 months |
| No catalyst | <45 days | 7 days | | |

These results show the weak stability of the systems with a latent catalyst (encapsulated amine) in comparison with the system with chemical blocking of the invention. The solution with chemical blocking also makes it possible to improve the storage time, and makes it possible to propose a truly one-component SCOD mastic.

The invention claimed is:

1. A method to adhesively bond sealing pieces, said method comprising:
   a step of applying to a substrate a liquid sealant composition comprising at least:
   (i) a polysulphide with an —SH end group,
   (ii) a crosslinking agent chosen from ethylenically unsaturated or acetylenically unsaturated compounds, said unsaturated ethylenic or unsaturated acetylenic functions of the crosslinking agent being chemically blocked with a blocking agent, wherein said blocking agent is a diene corresponding to the following formula:

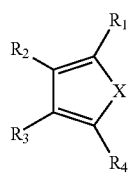

in which:
   the $R_1$ radical and optionally the $R_4$ radical are identical $C_1$-$C_{12}$ alkyl chains functionalized with at least one ester, ether, ketone or amide function,
   the $R_2$ radical, the $R_3$ radical and, optionally, the $R_4$ radical, if $R_4$ is not a functionalized $C_1$-$C_{12}$ alkyl chain, are hydrogen atoms,
   —X=$CH_2$, O, S, or N—$R_x$ in which $R_x$ is chosen from linear or branched $C_1$-$C_{30}$ alkyl chains,
   (iii) optionally, a catalyst, and
   a curing step of the mass of the sealant material by deprotection of the crosslinking agent chemically blocked with a blocking agent, under the effect of external energy, which results in the initiation of the reaction between the polysulphide and the crosslinking agent.

2. The method according to claim 1, wherein said unsaturated ethylenic or unsaturated acetylenic functions of the crosslinking agent are chemically blocked by Diels-Alder reaction with said blocking agent.

3. The method according to claim 1, wherein said crosslinking agent has a functionality f≥2.

4. The method according to claim 1, wherein said crosslinking agent is a compound or a mixture of several compounds bearing a function containing a double bond and selected from the group consisting of an allyl function, a maleimide function, and an ethylenically unsaturated, or a function containing a triple bond and consisting of an acetylenically unsaturated function, said functions bearing an electron-withdrawing group in the alpha position with respect to this double bond or this triple bond, it being possible for said functions selected from the group consisting of an aldehyde function, ketone function, ester function, hemiester function, amide function, hemiamide function, ester-amide function, nitrile function and imide function, said functions being α,β-ethylenically unsaturated.

5. The method according to claim 4, wherein said crosslinking agent is an α,β-ethylenically unsaturated imide compound or a mixture of several α,β-ethylenically unsaturated imide compounds chosen from monomaleimide, bismaleimide or trismaleimide compounds of formula:

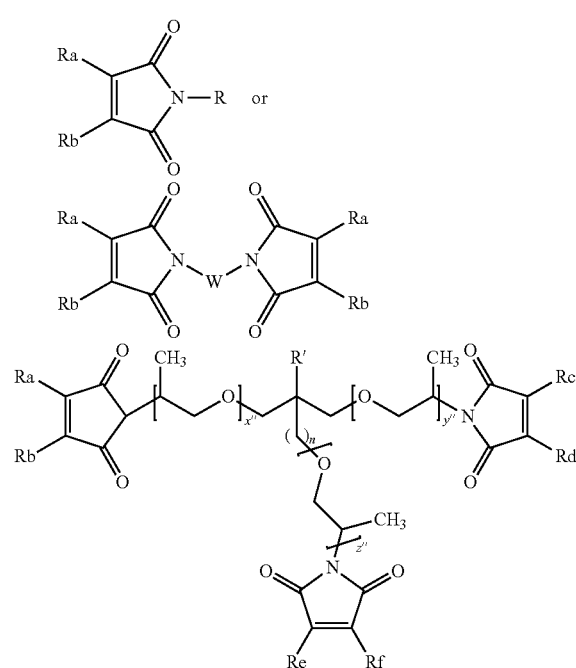

in which:
- R is chosen from linear or branched $C_1$-$C_{30}$ alkyl chains,
- $R_a$, $R_b$, $R_c$, $R_d$, $R_e$ and $R_f$, which may be identical or different, are chosen from H or linear or branched $C_1$-$C_{30}$ alkyl chains,
- W is a polyether, polythioether, polyester, polyamide or polysulphide unit,
- x″, y″ and z″, which may be identical or different, range from 1 to 70,
- the sum x″+y″+z″ is greater than 1,
- n ranges from 0 to 6, and
- R′ is H or a $C_1$-$C_6$ alkyl radical.

6. The method according to claim 5, wherein said crosslinking agent is a bismaleimide or trismaleimide compound in which W is a polyethylene glycol (PEG) unit, a polypropylene glycol (PPG) unit, or a mixed PEG/PPG unit, and is chosen from the compounds of formula:

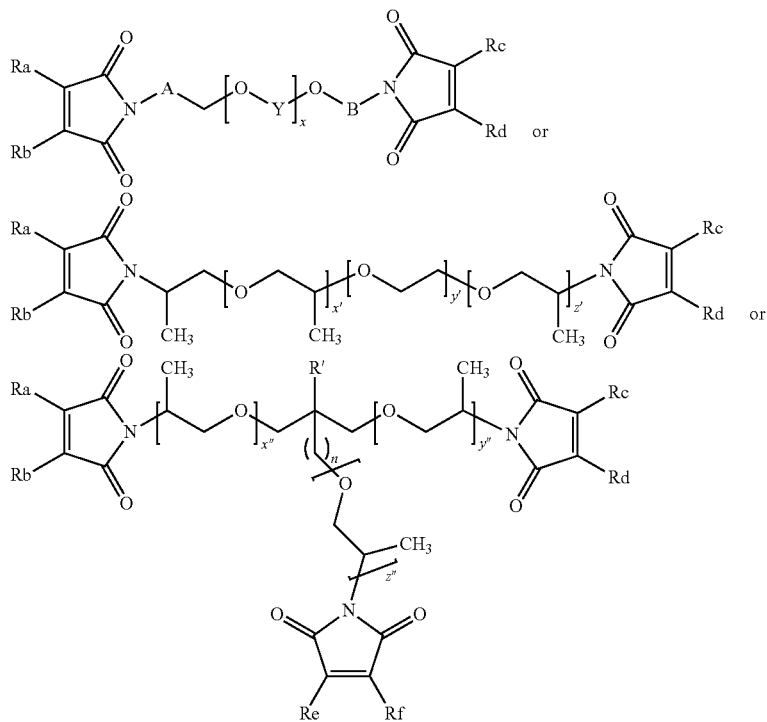

in which:
- $R_a$, $R_b$, $R_c$, $R_d$, $R_e$ and $R_f$, which may be identical or different, are chosen from H or linear or branched $C_1$-$C_{30}$ alkyl chains,
- A and B, which may be identical or different, are linear or branched $C_1$-$C_{30}$ alkyl chains, which can comprise, in their chain, one or more heteroatoms chosen from O, S or N,
- Y is chosen from —$CH_2$—, —$CH_2$—$CH_2$—, —$CH_2$—$CH_2$—$CH_2$—, —$CH_2$—$CH(CH_3)$— and —$CH_2$—$CH_2$—$CH_2$—$CH_2$,
- x, x′, x″, y′, y″, z′ and z″, which may be identical or different, range from 1 to 70,
- n ranges from 0 to 6,
- R′ is H or a $C_1$-$C_6$ alkyl radical, and in which or the ethylenic bonds of the bismaleimide or trismaleimide rings are blocked by Diels-Alder reaction with said blocking agent.

7. The method according to claim 1, in which X=O.

8. The method according to claim 1, in which the $R_1$ radical and optionally the $R_4$ radical are chosen from the following groups:

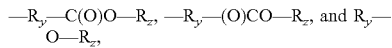

in which:
- $R_y$ is a linear or branched $C_1$-$C_8$ alkyl chain,
- $R_z$ is a linear, branched or cyclic $C_1$-$C_{12}$, or an aryl group.

9. The method according to claim 1, wherein said blocking agent is chosen from: furfuryl acetate, furfuryl benzyl, ethyl 3-(2-furyl)propanoate, furan-2-ylmethyl pivalate, furan-2-ylmethyl-3,5,5-trimethyl hexanoate and furan-2-ylmethylcyclohexanecarboxylate.

10. The method according to claim 1, in which the crosslinking agent chemically blocked with a blocking agent is deprotected by retro-Diels-Alder.

11. The method according to claim 1, in which the external energy is provided by conduction, by convection or by radiation.

12. The method according to claim 1, in which the crosslinking agent chemically blocked with a blocking agent is deprotected by heating at a temperature in the range of from 60 to 120° C.

13. The method according to claim 1, in which the crosslinking agent chemically blocked with a blocking agent is subjected to the action of heat for a period ranging from 15 minutes to 2 hours.

14. The method according to claim 1, in which the curing step is carried out at a temperature ranging from 18 to 35° C., for a period ranging from 1 to 3 days.

15. The method according to claim 1, wherein said sealing pieces are aimed for constructing and/or maintaining devices selected from the group consisting of aircraft, spacecraft, motor vehicles, rail vehicles, ships, machines, appliances and furniture.

16. The method according to claim 1, wherein said sealing pieces are aimed for bonding and/or protecting against corrosion of devices selected from the group consisting of aircraft, spacecraft, motor vehicles, rail vehicles, ships, machines, appliances and furniture.

17. A process for preparing a liquid sealant composition in which the composition comprises
   (a) a polysulphide with an —SH end group,
   (b) a crosslinking agent chosen from ethylenically unsaturated or acetylenically unsaturated compounds, said unsaturated ethylenic or unsaturated acetylenic functions of the crosslinking agent being chemically blocked with a blocking agent, wherein said blocking agent is a diene corresponding to the formula:

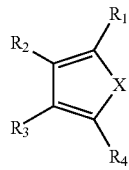

in which:
   the $R_1$ radical and optionally the $R_4$ radical are identical $C_1$-$C_{12}$ alkyl chains functionalized with at least one ester, ether, ketone or amide function,
   the $R_2$ radical, the $R_3$ radical and, optionally, the $R_4$ radical, if $R_4$ is not a functionalized $C_1$-$C_{12}$ alkyl chain, are hydrogen atoms,
   X=$CH_2$, O, S, or N—$R_x$ in which $R_x$ is chosen from linear or branched $C_1$-$C_{30}$ alkyl chains,
   (c) optionally, a catalyst, wherein the process comprises at least the following steps:

i) synthesizing of a crosslinking agent chosen from ethylenically unsaturated or acetylenically unsaturated compounds, said unsaturated ethylenic or unsaturated acetylenic functions of the crosslinking agent being chemically blocked by Diels-Alder reaction with a blocking agent, optionally in the presence of a catalyst, then
   ii) mixing of the chemically blocked crosslinking agent obtained at the end of step i) with a liquid polysulphide polymer comprising an —SH end group, optionally in the presence of a catalyst, the mixing temperature having to be controlled so as not to exceed the crosslinking agent deblocking temperature.

18. The process according to claim 17, comprising a step of applying the composition to a substrate, followed by a step of deprotecting the crosslinking agent chemically blocked with a blocking agent, under the effect of external energy, which results in the initiation of the reaction between the polysulphide and the crosslinking agent, and therefore in the curing of the mass of the sealant material.

19. The process according to claim 17, in which the crosslinking agent chemically blocked with a blocking agent is deprotected by retro-Diels-Alder.

20. The process according to claim 17, in which the external energy is provided by conduction, by convection or by radiation.

21. The process according to claim 17, in which the crosslinking agent chemically blocked with a blocking agent is deprotected by heating at a temperature in the range of from 60 to 120° C.

22. The process according to claim 17, in which the crosslinking agent chemically blocked with a blocking agent is subjected to the action of heat for a period ranging from 15 minutes to 2 hours.

* * * * *

UNITED STATES PATENT AND TRADEMARK OFFICE
CERTIFICATE OF CORRECTION

PATENT NO. : 9,850,412 B2  
APPLICATION NO. : 14/703111  
DATED : December 26, 2017  
INVENTOR(S) : Laborbe et al.

It is certified that error appears in the above-identified patent and that said Letters Patent is hereby corrected as shown below:

In the Claims

Columns 17 and 18:
Lines 18 - 48, the formula should appear as follows:

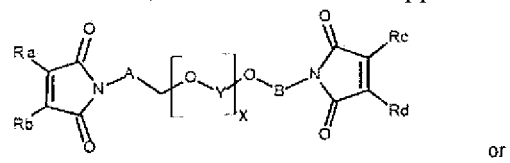

or

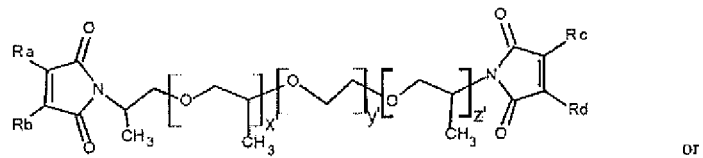

or

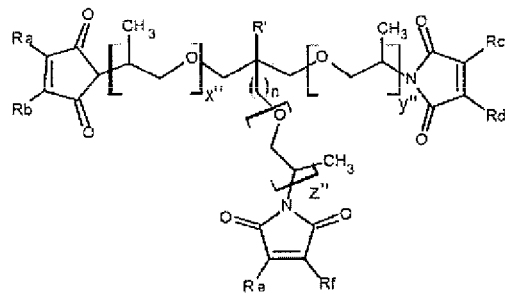

Signed and Sealed this  
Fifth Day of June, 2018

Andrei Iancu  
*Director of the United States Patent and Trademark Office*